No. 885,562. PATENTED APR. 21, 1908.
W. A. F. ALT.
SECONDARY BATTERY.
APPLICATION FILED APR. 1, 1907.
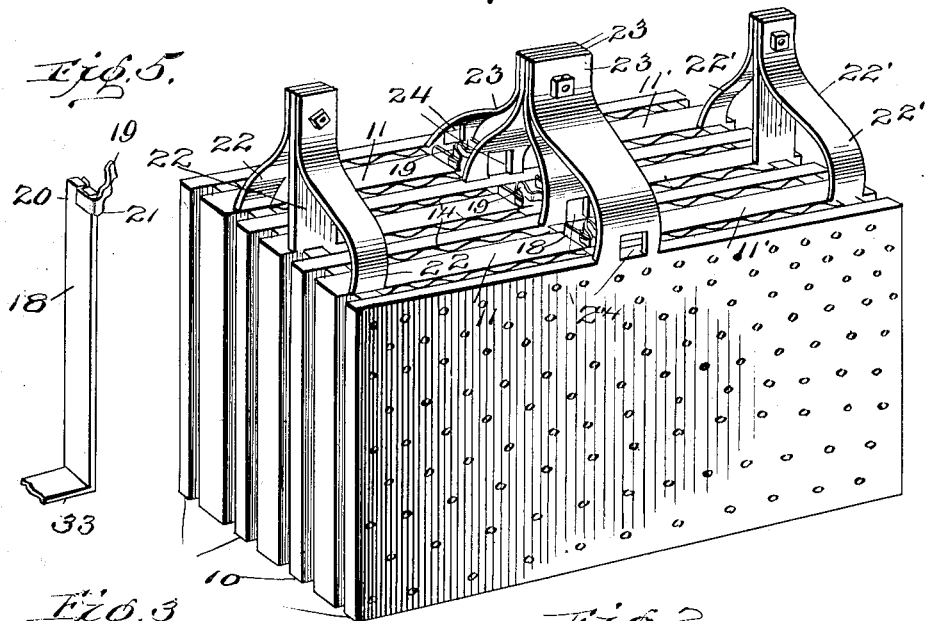
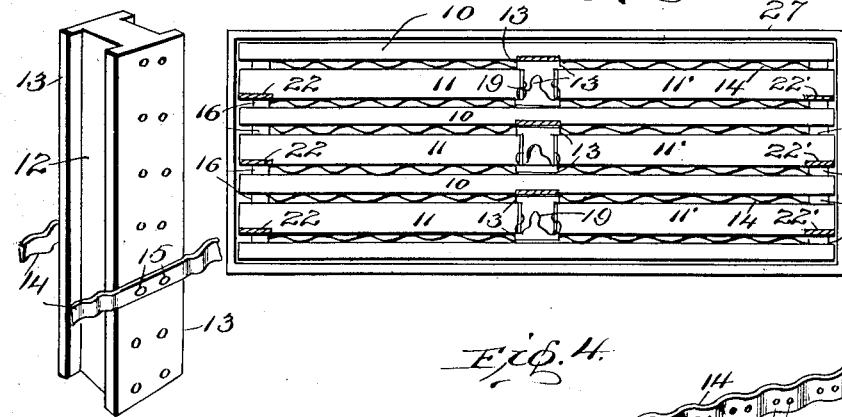
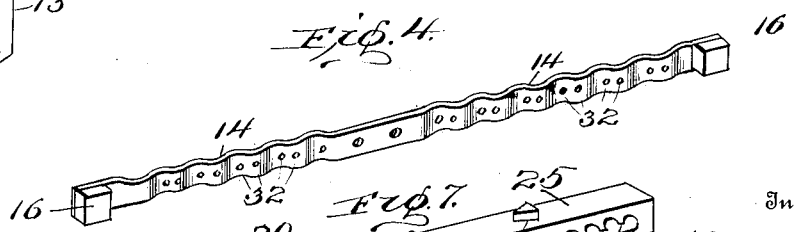

UNITED STATES PATENT OFFICE.

WILLIAM A. F. ALT, OF BROOKLYN, NEW YORK, ASSIGNOR, BY MESNE ASSIGNMENTS, TO AMERICAN BATTERY COMPANY, OF CEDARHURST, NEW YORK, A CORPORATION OF NEW YORK.

SECONDARY BATTERY.

No. 885,562.     Specification of Letters Patent.     Patented April 21, 1908.

Application filed April 1, 1907. Serial No. 365,742.

*To all whom it may concern:*

Be it known that I, WILLIAM A. F. ALT, a citizen of the United States, residing at Brooklyn, in the county of Kings and State of New York, have invented certain new and useful Improvements in Secondary Batteries; and I do hereby declare the following to be a full, clear, and exact description of the invention, such as will enable others skilled in the art to which it appertains to make and use the same.

This invention relates to storage or secondary batteries, and has for an object to provide a cell having an element of one sign divided into a plurality of parts, the sum of whose parts equal the other element.

A further object of the invention is to provide in a secondary cell a plurality of spaced elements of the same sign, and with elements of the opposite sign disposed between the first-mentioned elements, the said last-mentioned elements being divided so that their sum is a multiple of the first-mentioned elements less one.

Specifically as shown and herein described the cell comprises a plurality of spaced negative plates with positive plates disposed between the negative plates and each of said positive plates divided into a plurality of parts, the sum of which parts equal the surface of the negative plates and with means so arranged that one series of positive plates may be charged and discharged independently of or in association with the other or another group of positive plates.

A further object of the invention is to provide in a cell having a plurality of divided plates of the same sign, means attached to the said plates and adapted to automatically engage similar means upon the other plate to connect the said elements, and with an insulating member adapted to be inserted between the connecting members to insulate one group of plates from the other.

With these and other objects in view, the invention comprises certain novel constructions, combinations and arrangements of parts, as will be hereinafter fully described and claimed.

In the drawings:—Figure 1 is a perspective view of a group of plates removed from the inclosing casing. Fig. 2 is a top plan view of a group of plates in a casing and with the binding posts and elements shown in section. Fig. 3 is a perspective view of one of the insulating members employed to separate and insulate positive plates from each other. Fig. 4 is a perspective view of an insulating separator adapted to separate the positive from the negative plates, and to provide for space for the receipt of electrolyte. Fig. 5 is a perspective view of a post forming one of the contiguous ends of the divided positive plates. Fig. 6 is a fragmentary sectional view showing one of the elements in section. Fig. 7 is a perspective view of one of the insulating members employed to break electrical connection between the divided positive plates.

Like characters of reference designate corresponding parts throughout the several views.

The cells embodied in the present invention comprise a plurality of spaced plates of the same sign as at 10, here shown as representing the negative plates and with positive plates as 11 and 11' disposed between and alternating with the negative plates 10.

As shown in Figs. 1 and 2, the positive plates are divided into halves, which substantially equal in surface area the surface of one of the contiguous negative plates, but it is to be understood that the invention is not limited to the dividing of the positive plate in two sections, but is to comprehend the dividing of the plate into any number of sections desired, the sum of whose area equals approximately the area of a contiguous negative plate.

The positive plates, as 11, and 11', are separated by the employment of an insulating separator 12 formed with flanges 13 spaced apart to embrace the positive plates upon opposite sides and of sufficient thickness to nearly fill the interval between the positive and negative plates.

Upon the sides of the insulating separator 12 are secured sinuous insulating separators 14 secured adjacent their middle points to the insulating separator 12 as by the screws 15. At their opposite ends the sinuous separators 14 are provided with insulating blocks 16 positively spacing the negative and positive plates. By the employment of the sinuous separator 14 spaces are left for the introduction of acids or other electrolytes ordinarily employed in secondary batteries.

The elements or plates here shown as the negative plates are simply constructed by a metallic envelop 17 filled with any of the usual and ordinary active materials and perforated in the usual well known manner. The positive plates also comprise sheet metal envelops, as 17, having at one end an upstanding post 18, the end supplied with the post 18 being located contiguous to the other positive plate and divided therefrom by one of the separators 12. The end of the post 18 extends upwardly above the plate and is provided with a sinuous contact spring 19 extending at an inclination toward the adjacent element of the same sign and normally contacting with a similar sinuous contact spring extending at a reverse inclination from the said adjacent plate, thereby electrically connecting the plates of like sign. The sinuous spring 19 may be secured to the post in any approved manner as by forming a slit 20 in the end thereof into which the spring is inserted and then bent about the edge of the post as shown at 21, particularly in Fig. 5, although any other method of securing the sinuous spring to the post may be employed.

The positive plates are provided with upstanding binding posts 22 and 22', respectively, which are preferably located at opposite ends of the assembled plates and the negative plates are provided with similar binding posts 23 upstanding from the said negative plates intermediate their ends, all of said binding posts forming continuations of the metallic envelop in which the plate is incased. The binding posts 23 of the negative plates are provided with openings 24 proportioned and positioned to permit the insertion therethrough of an insulating member 25, shown at Fig. 7, which, when inserted, forces apart the contact sinuous springs 19 and thereby insulates the group of positive plates 11 from the group of positive plates 11'.

The member 25 is provided at one end with a stud 26 adapted and proportioned to be inserted through an opening in the side of the casing 27, and a spring 28 is disposed upon the stud 26 and bears against the inner surface of the casing. Upon the under side of the member 25 a plurality of wedge or V-shaped projections 29 are formed positioned to engage the inner surfaces of the contact members 19, and as the insulating member 25 is moved longitudinally against the tension of the spring 28, the projections 29 are forced between the contact members 19 and separate them. The member 25 is, of course, inserted through the sides of the casing 27, and a slot 30 is provided having a plurality of teeth 31, so that when the member 25 has been pushed against the tension of the spring 28 to separate the contact members 19, a pin may be inserted through the slot 30 and engaging the teeth 31 and the inner surface of the casing 27 maintain the member 25 in position to disconnect the contact members 19.

When the pin is removed from the teeth 31 the spring 28 forces the insulating member 25 backwardly permitting the spring contact members 19 to again engage each other.

The sinuous insulating strip 14 is preferably provided with a plurality of holes or openings 32 permitting thereby the circulation of the electrolyte more freely between the electrodes. The binding post 18 is preferably provided at its lower end with a flange 33 disposed upon the lower edge of the plates or electrodes 11 and 11' and bearing upon the bottom of the casing.

While the electrodes have been described herein and called plates, and have been specifically described as being formed of envelops of metallic sheet material filled with active material, it is to be understood that the invention is not limited to electrodes so formed, but comprehends electrodes of any size, shape and material, both with and without envelops and both with and without perforations as herein shown and described.

What I claim is:—

1. In a secondary battery, a plate of one sign, and a plurality of plates of the opposite sign, the aggregate area of said plurality of plates being substantially equal to the area of the single plate, means insulating the plates one from another, contact means carried by the plurality of plates adapted to engage like means, and means for separating the contact means.

2. In a secondary battery, a plate of one sign, a plurality of plates of the opposite sign, the aggregate area of said plurality of plates being substantially equal to the area of a single plate, means insulating the plurality of plates from the single plate, means insulating the plurality of plates each from the other, contact members carried at contiguous ends of the plurality of plates and adapted to engage like contact members, and means adapted to be inserted between and to separate the contact members.

3. In a secondary battery, a plurality of positive plates arranged in groups, the individual plates being insulated from each other, separable connections electrically connecting together elements of the separate groups, connections joining together the plates of each group, a plurality of negative plates interposed alternately between the positive plates, each of said negative plates having a surface substantially equal to that of the several co-acting positive plates, connections joining together the several negative plates, and means to separate the separable connections of the positive plates.

In testimony whereof I affix my signature in presence of two witnesses.

WILLIAM A. F. ALT.

Witnesses:
HARRY C. ADAMS,
L. L. MORRILL.